United States Patent
Cao et al.

(10) Patent No.: US 9,542,928 B2
(45) Date of Patent: Jan. 10, 2017

(54) GENERATING NATURAL LANGUAGE OUTPUTS

(71) Applicant: MICROSOFT CORPORATION, Redmond, WA (US)

(72) Inventors: Guihong Cao, Sammamish, WA (US); Fetiye Karabay, Redmond, WA (US); Ahmed Mohamed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 14/224,430

(22) Filed: Mar. 25, 2014

(65) Prior Publication Data
US 2015/0279348 A1   Oct. 1, 2015

(51) Int. Cl.
*G10L 13/027*  (2013.01)
*G06F 17/30*   (2006.01)
*G06F 17/28*   (2006.01)

(52) U.S. Cl.
CPC ........ *G10L 13/027* (2013.01); *G06F 17/2881* (2013.01); *G06F 17/3043* (2013.01); *G06F 17/30604* (2013.01); *G06F 17/30654* (2013.01); *G06F 17/30684* (2013.01); *G06F 17/30864* (2013.01)

(58) Field of Classification Search
CPC ... G06F 17/27; G06F 17/2785; G06F 17/2881
See application file for complete search history.

(56) References Cited

U.S. PATENT DOCUMENTS

| | | | |
|---|---|---|---|
| 6,675,159 B1 * | 1/2004 | Lin | G06F 17/2705 |
| 7,003,445 B2 | 2/2006 | Humphreys et al. | |
| 7,209,876 B2 * | 4/2007 | Miller | G10L 15/22 704/9 |

(Continued)

FOREIGN PATENT DOCUMENTS

| | | |
|---|---|---|
| EP | 1205852 A3 | 8/2003 |
| EP | 2157571 A2 | 2/2010 |

OTHER PUBLICATIONS

Simmons, Robert, and Jonathan Slocum. "Generating English discourse from semantic networks." Communications of the ACM 15.10 (1972): 891-905.*

(Continued)

*Primary Examiner* — Brian Albertalli
(74) *Attorney, Agent, or Firm* — Jessica Meyers; Tom Wong; Micky Minhas

(57) ABSTRACT

Methods, computer systems, and computer-storage media are provided for generating natural language outputs. Sets of triples may be used to map voice queries and answers to sentence structures that may be used as an output answer to the voice query. Sentence structures are only appropriate with certain sets of triples. One or more constraints may be associated with the set of triples to make sure sentence structures are only applied in correct situations. In order to be a valid sentence structure, each constraint associated therewith must be satisfied. If each constraint is satisfied, the sentence structure is valid and may be used as the format for an output answer. If each constraint is not satisfied, additional sentence structures associated with the set of triples may be evaluated until a valid sentence structure is identified. If no sentence structure is valid, no output is generated.

17 Claims, 5 Drawing Sheets

(56) References Cited

U.S. PATENT DOCUMENTS

| | | | |
|---|---|---|---|
| 7,266,491 | B2 | 9/2007 | Humphreys et al. |
| 7,376,645 | B2* | 5/2008 | Bernard ............ G06F 17/30654 |
| 7,962,323 | B2 | 6/2011 | Johnson et al. |
| 8,719,005 | B1* | 5/2014 | Lee ....................... G06F 17/271 704/10 |
| 2003/0018469 | A1* | 1/2003 | Humphreys ........ G06F 17/2881 704/9 |
| 2003/0191625 | A1* | 10/2003 | Gorin .................... G06F 17/278 704/1 |
| 2006/0155530 | A1 | 7/2006 | Altevogt et al. |
| 2010/0057463 | A1* | 3/2010 | Weng ...................... G06F 17/27 704/257 |
| 2011/0307435 | A1 | 12/2011 | Overell et al. |
| 2013/0262361 | A1 | 10/2013 | Arroyo et al. |
| 2014/0122535 | A1* | 5/2014 | Gerard .................... G06F 17/30 707/802 |
| 2015/0127323 | A1* | 5/2015 | Jacquet ................. G06F 17/271 704/9 |
| 2015/0186504 | A1* | 7/2015 | Gorman ............ G06F 17/30684 707/752 |

OTHER PUBLICATIONS

Litkowski, Kenneth C. "Question-Answering Using Semantic Relation Triples." TREC. 1999.*

Zhu, Xin-hua, Qing-hua Cao, and Fang-fang Su. "A Chinese Intelligent Question Answering System Based on Domain Ontology and Sentence Templates." International Journal of Digital Content Technology & its Applications 5.11 (2011).*

"International Search Report & Written Opinion Issued in PCT Application No. PCT/US2015/021621", Mailed Date: Jul. 27, 2015, 10 Pages.

Rao, et al., "Natural Language Query Processing Based On Probabilistic Context Free Grammar", Retrieved on: Jan. 7, 2014, Available at: http://www.bvucoepune.edu.in/pdfs/Research%20and%20Publication/Research%20Publications_2007-08/National%20Conference_2007-08/Natural%20Language%20Mrs%20Gauri%20Rao.pdf.

Huang, et al., "A Natural Language Database Interface Based on a Probabilistic Context Free Grammar", In IEEE International Workshop on Semantic Computing and Systems, Jul. 14, 2008, 8 pages.

Carvalho, et al., "Graphia: Extracting Contextual Relation Graphs from Text", In Proceedings of Semantic Web: ESWC Satellite Events, May 26, 2013, 5 pages.

Kadlec, Vladimir, "Syntactic Analysis of Natural Languages Based on Context-Free Grammar Backbone", In Proceedings of Multimedia Information Systems, Sep. 2007, 107 pages.

"Introduction to Natural Language Processing", In Proceedings of Consortium on Cognitive Science Instruction, Feb. 21, 2009, 30 pages.

Starkie, Bradford, "Inferring Attribute Grammars with Structured Data for Natural Language Processing", In Proceedings of the 6th International Colloquium on Grammatical Inference: Algorithms and Applications, Sep. 23, 2002, 12 pages.

Bacchelli, et al., "Extracting Structured Data from Natural Language Documents with Island Parsing", In 26th IEEE/ACM International Conference on Automated Software Engineering, Nov. 6, 2011, 4 pages.

Chen, et al., "Automatic Learning of Context-Free Grammar", In Proceedings of 18th Conference on Computational Linguistics and Speech Processing, Jan. 2, 2014, 10 pages.

"Second Written Opinion Issued in PCT Application No. PCT/US2015/021621", Mailed Date: Feb. 23, 2016, 8 Pages.

"International Preliminary Report on Patentability Issued in PCT Application No. PCT/US2015/021621", Mailed Date: Jun. 8, 2016, 9 Pages.

* cited by examiner

… (US 9,542,928 B2)

GENERATING NATURAL LANGUAGE OUTPUTS

BACKGROUND

Natural language generation is generally performed using a set of triples from a knowledge base. The triples are compiled into a valid natural language sentence. It is increasingly common for a user to desire a natural language sentence output in response to a query they have verbally submitted to a device. Oftentimes, in response to a naturally expressed, verbal query, the returned natural language sentence answer is incorrect or robotic and unnatural sounding.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, generating a natural language output. As mentioned, the present invention seeks to generate a natural language output that is both correct (or valid) and natural sounding in that the output is a sentence that flows well when spoken. Knowledge base triples may be used to express a query into a machine-readable language that can be transformed into a natural language output. The triples may be associated with one or more sentence structures that are appropriate to use for a particular triple. A sentence structure, as used herein, refers generally to an exemplary context free sentence format including one or more variables that may be substituted. The triples and/or sentence structures may also be associated with one or more constraints. Constraints, as used herein, refers generally to a rule that limits a type of value that may be substituted for the variable. A sentence structure may be used as an output answer when constraints associated with that sentence structure are satisfied, as will be discussed in detail herein.

Accordingly, in one embodiment, the present invention is directed to one or more computer-storage media having computer-executable instructions embodied thereon that, when executed by one or more computing devices, perform a method of generating a natural language output. The method comprises receiving a query from a user; identifying an answer to the query; mapping the answer to structured data from a knowledge base; identifying a sentence structure associated with the structured data; identifying one or more constraints associated with the sentence structure are satisfied; and upon satisfying each of the one or more constraints, communicating an output answer to the query in the form of a sentence.

In yet another embodiment, the present invention is directed to a computer system for generating a natural language output. The system comprises a computing device associated with a natural language engine having one or more processors and one or more computer-storage media; and a data store coupled with the natural language engine, wherein the natural language engine identifies an answer to a query, maps the answer to structured data from a knowledge base, identifies a sentence structure associated with the structured data, identifies one or more constraints associated with the sentence structure, and communicates an output answer to the query in the form of a sentence.

In another embodiment, the presented invention is directed to a computerized method for generating a natural language output. The method comprises receiving a query from a user; identifying an answer to the voice input query; mapping the answer to a set of triples; identifying at least one rule associated with the set of triples, wherein the at least one rule includes a context free grammar sentence structure associated with the set of triples and at least one constraint associated with the context free grammar sentence; determining whether the at least one constraint is satisfied; and upon determining the at least one constraint associated with the context free grammar sentence is satisfied, communicating a voice output answer to the voice input query in a sentence.

BRIEF DESCRIPTION OF THE DRAWINGS

The present invention is described in detail below with reference to the attached drawing figures, wherein.

DETAILED DESCRIPTION

Figure 1:
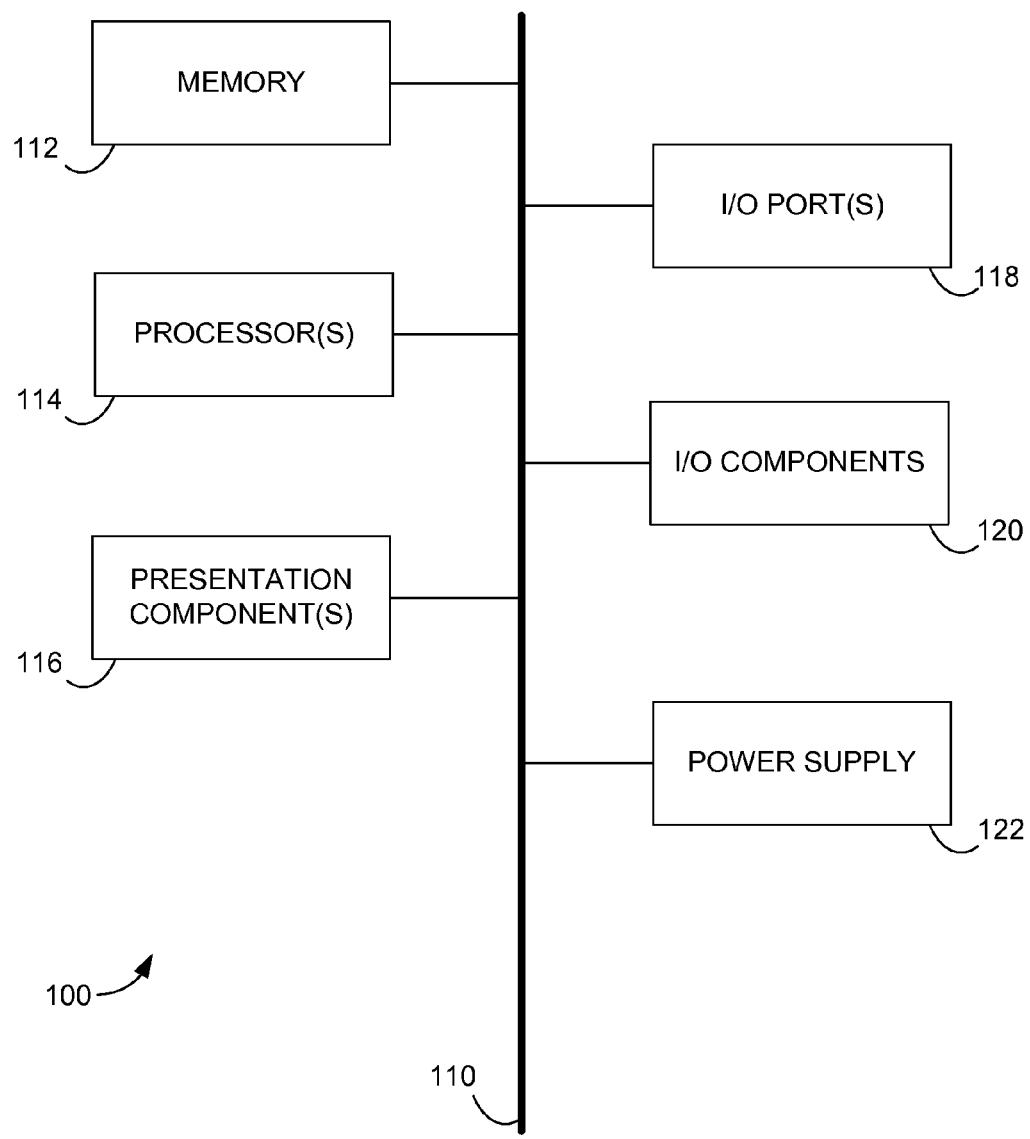
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, generating a natural language output. The present invention is directed to generating a natural language output that is both correct (or valid) and natural sounding in that the output is a sentence that flows well when spoken. Knowledge base triples may be used to express a query into a machine-readable language. The triples may be associated with sentence structures that are appropriate to use for a particular triple. A sentence structure, as used herein, refers generally to an exemplary context free sentence format including one or more variables that may be substituted. The triples and/or sentence structures may also be associated with one or more constraints. Constraints, as used herein, refers generally to a rule that limits the type of value that may be substituted for the variable. A sentence structure may be used as an output answer when constraints associated with that sentence structure are satisfied.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a cloud server, a set of one or more processes distributed on one or more computers, one or more stand-alone storage devices, a set of one or more other computing or storage devices, a combination of one or more of the above, and the like.

Figure 2:
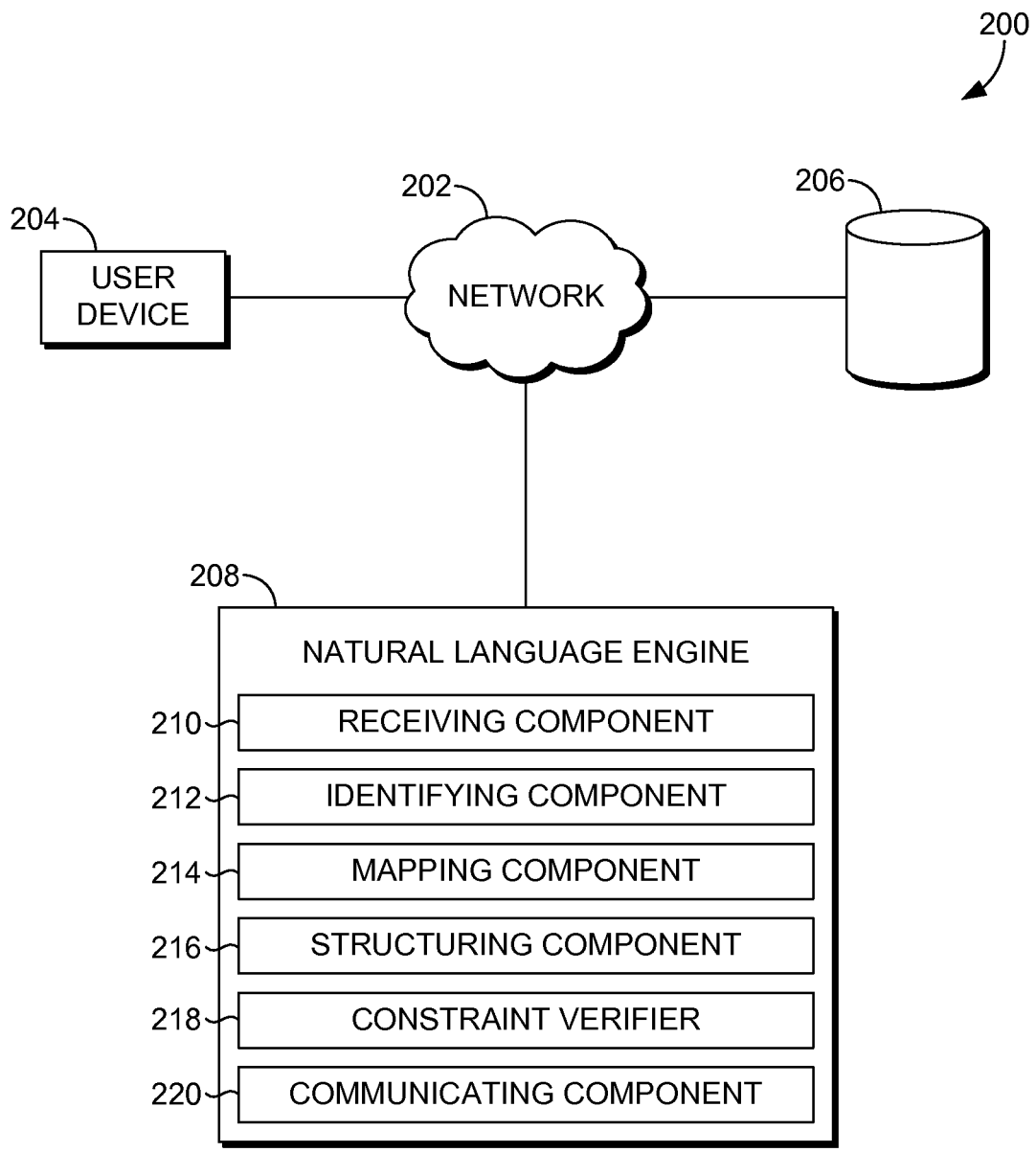
FIG. 2 is a block diagram of an exemplary system for generating a natural language output suitable for use in implementing embodiments of the present invention.

Referring now to FIG. 2, a block diagram is provided illustrating an exemplary computing system 200 in which embodiments of the present invention may be employed. Generally, the computing system 200 illustrates an environment where natural language outputs are generated.

Among other components not shown, the computing system 200 generally includes a network 202, a user device 204, a database 206, and a natural language engine 208. The network 202 may include, without limitation, one or more local area networks (LANs) and/or wide area networks (WANs). Such networking environments are commonplace in offices, enterprise-wide computer networks, intranets and the Internet. Accordingly, the network 202 is not further described herein.

The database 206 may be any type of data storage device capable of storing data. As such, the database 206 may be an online repository of data. Databases are commonplace in computer networks and, therefore, will not be further described herein.

The user device 204 may be any computing device capable of communicating a voice input query and receiving a voice output query. For example, computing device 100 of FIG. 1 may be an exemplary user device. In particular embodiments, the user device 204 is a mobile phone.

The natural language engine 208 may be any device capable of implementing the present invention. The natural language engine 208 may be configured for, among other things, compiling natural language outputs in response to a query. Natural language outputs, in an embodiment, are verbal responses in the form of a sentence (e.g., sentences that are read by the user device 204). In an embodiment, a single sentence is the natural language output. In alternative embodiments, a plurality of sentences may be output. The natural language engine 208 may include a receiving component 210, an identifying component 212, a mapping component 214, a structuring component 216, a constraint verifier 218, and a communicating component 220.

The receiving component 210 may be configured to, among other things, receive one or more queries. The queries may be input by a user via, for example, the user device 204. In embodiments, the queries are voice input queries meaning the query is spoken by a user rather than input via a keyboard. However, the queries may be input via a keyboard in some instances.

Voice input queries, as previously mentioned, may be spoken by a user. The voice input queries may be spoken in a natural language format. In other words, the voice input query is typically submitted in the form of a question that a user would naturally ask to, for example, another human. As such, a meaning of the voice input queries may be identified by a parser (not shown). Parsing search queries for a semantic meaning is understood in the art and any method known to one of skill in the art may be utilized to identify a meaning of a query. Identifying a meaning of a query increases the likelihood that an answer identified in response to the query will be correct.

The identifying component 212 may be configured to, among other things, identify an answer to the voice input query. The identifying component 212 may utilize the meaning of the voice input query (identified by the parser) to identify an answer. An answer may be identified from the database 206. An exemplary voice input query:answer pair would be:

Voice Input Query: What does Tom Hanks do?
Answer: Actor

The parser, in this instance may identify the meaning of the voice input query as identifying an occupation for a source entity (i.e., Tom Hanks).

The mapping component 214 may be configured to, among other things, map the answer to the voice input query to structured data in a knowledge base. This structured data may be one or more triples. A set of triples, as used herein, refers to a grouping of a subject, predicate, and object. Mapping answers to a set of triples converts natural language voice input queries and answers to a format readable by the natural language engine 208.

Continuing with the example above, the set of triples may be:

Tom Hanks, Occupation, Actor

The set of triples may also look something like:

Tom Hanks, current job, Actor

Tom Hanks is the subject, occupation or current job is the predicate, and actor is the target or object.

Once the answer is mapped to a set of triples, the system 200 may identify a sentence structure for the set of triples. The structuring component 216 may be configured to, among other things, identify one or more sentence structures associated with a set of triples. A sentence structure, as previously stated, is an exemplary context free sentence format including one or more variables that may be substituted with values. In other words, the variables may be substituted with context. There is a finite set of valid sentence structures associated with any set of triples as every sentence structure is only valid under a certain set of circumstances.

An exemplary sentence structure that may be associated with the above listed set of triples (i.e., Tom Hanks, current job, actor) may be:

[Source Entity ID] current job is an [target entity ID].
In this instance, the variables are [source entity ID] and [target entity ID]. The source entity ID may be replaced with Tom Hanks and the target entity ID may be replaced with actor to yield the following sentence output:

Output: Tom Hanks' current job is an actor.

Sentence structures may be associated with a set of triples and a set of constraints. Constraints, as previously mentioned, refer generally herein to rules that limit a type of value that may be substituted for the variable. Constraints are utilized to make sure the sentence structure is only applicable for specific sets of triples. For instance, the above sentence structure

[Source Entity ID] current job is an [target entity ID] would not be applicable to a set of triples such as:

Tom Hanks, height, 6 feet.

This set of triples is clearly associated with a voice input query regarding the height of Tom Hanks. Thus, a sentence structure detailing a current occupation is not relevant. Constraint verification ensures that a valid sentence structure is chosen for a voice output answer.

The constraint verifier 218 may be configured to, among other things, verify one or more constraints associated with a sentence structure. Once the one or more sentence structures are identified, constraints associated therewith are evaluated to see if they are satisfied. In order for a sentence structure to be used as a voice output answer each constraint associated with a sentence structure must be satisfied. If each constraint is not satisfied, another sentence structure may be evaluated until a sentence structure with all constraints satisfied is identified. For instance, take the following example:

Voice Input Query: How tall is Tom Hanks?
Answer: 6 feet
Triples: Tom Hanks, height, 6 feet This triple may be associated with the following sentence structure:

[Source Entity ID] is [target entity ID] feet tall.

This sentence structure may be associated with the following constraints, among others:

Constraint 1: [source entity ID]=human
Constraint 2: [target entity ID]=numeral

In this example, [source entity ID] is Tom Hanks (i.e., a human) and the [target entity ID] is 6 (i.e., a numeral). Thus, each of constraints 1 and 2 are satisfied. The constraint verifier 218 would, in this case, determine that each constraint is satisfied and identify that the sentence structure is a valid sentence structure. Constraints may limit subjects, objects, predicates, relationships between subjects and objects, and the like.

Alternatively, if a sentence structure is not found to be a valid sentence structure (e.g., each constraint associated with the sentence structure is not satisfied) then the sentence structure will not be selected as a valid sentence structure to use for a voice output answer. In that situation, another sentence structure associated with the set of triples may be identified and the constraints associated therewith verified. If no valid sentence structure is identified then no output is communicated.

The communicating component 220 may be configured to, among other things, communicate voice output answers. The voice output answer may be a single sentence or a plurality of sentences. For instance, in the above example, the voice output answer may be "Tom Hanks is 6 feet tall." The communicating component 220 may communicate the voice output answer to the user device 204.

In an embodiment, the communicating component 220 may communicate the voice output answer in combination with a search results page. For example, the voice output answer "Tom Hanks is 6 feet tall" may be verbally delivered (as well as textually delivered) while a search results page is also presented. The search results page may be a source for the voice output answer.

In an embodiment, a ranking component (not shown) may be configured to, among other things, rank sentence structures when more than one sentence structure may be valid. For example, if a sentence should be constructed in response to a voice input query for an answer including place of birth and date of birth, it may be desirable to say birth date first and then place of birth. For example, a voice input query of "Tom Hanks place and date of birth" the output answer may be "Tom Hanks was born on Jul. 9, 1956, in the city of Concord." This sentence structure may be deemed to flow better than one listing the place of birth first. A ranking component may be configured to rank sentence structures based on various preferences and/or rules built into the system 200 such that higher ranking sentence structures are selected.

In application, a voice input query is received. An example voice input query may be: "Who is Tom Hanks' wife?" An answer to this query is "Rita Wilson." This voice input query and answer may be mapped to a set of triples that look like this: "Tom Hanks, marriage, Rita Wilson." A sentence structure associated with the answer and triples may be identified. An exemplary associated sentence structure may be:

[Source Entity ID] is currently married to [target entity ID] since [token].

A set of constraints associated with the sentence structure is then identified. A set of constraints for this particular sentence may be:

Constraint 1: source entity ID=human
Constraint 2: target entity ID=human
Constraint 3: marriage between source entity ID and target entity ID with no end date
Constraint 4: token=year Constraint 3 limits the sentence structure to a current marriage as there is no end date. The source entity ID in this example is Tom Hanks (i.e., a human), the target entity ID is Rita Wilson (i.e., a human), and the marriage has no end date as they have been married since 1988, i.e., the token. Thus, all constraints are satisfied and the sentence structure may be identified as valid. The voice output answer may be "Tom Hanks is currently married to Rita Wilson since 1988."

Additional sentences may be added to the voice output answer. Additional sentences may be desired based on the meaning of the query. For example, it may be useful to someone asking about Tom Hanks' wife to know of a previous wife or wives. An additional set of triples may be associated with the voice input query. For example, the additional set of triples may look like: "Tom Hanks, previous marriage, Samantha Lewes." The additional sentence may be associated with a sentence structure. When identifying potential sentence structures, the primary sentence structure (i.e., [source entity ID] is currently married to [target entity ID] since [token].") may be identified so that the two sentences flow together. A subsequent sentence structure may be: "[source entity ID] was previously married to [target entity ID] from [token] to [token]". Constraints associated with this sentence structure may be:

Constraint 1: source entity ID=human
Constraint 2: target entity ID=human
Constraint 3: token=year
Constraint 4: end date of marriage between source entity ID and target entity ID present.

Additional constraints may be present to further narrow the sentence structure such that the source entity ID is the same source entity ID as in the previous sentence and the target entity ID is different from the target entity ID in the previous sentence.

Each of the constraints in this example are satisfied as both Tom Hanks and Samantha Lewes are humans that were married and have an end date to the marriage. Thus, the voice output answer may be: "Tom Hanks was previously married to Samantha Lewes from 1978 to 1987." In an embodiment, subsequent sentences may be associated with pronouns rather than restating entities that are the same. For instance, rather than saying "Tom Hanks is currently married to Rita Wilson since 1988. Tom Hanks was previously married to Samantha Lewes from 1978 to 1987," the output could be instead "Tom Hanks is currently married to Rita Wilson since 1988. He was previously married to Samantha Lewes from 1978 to 1987."

An additional example may be a voice input query asking if X is a former member of Y group. A sentence structure associated with that voice input query may be "[source entity ID] is a former member of [target entity ID]." Exemplary constraints for this example may be:

Constraint 1: source entity ID=human
Constraint 2: target entity ID=political party
Constraint 3: source entity ID is no longer a member of target entity ID.

Constraints ensure that sentence structures are only chosen as valid sentence structures in appropriate situations. In the above example asking about a former member of a political party, a sentence structure relating to net worth (e.g., [source entity ID] net worth is [token] will not be chosen as constraint 3 where the source is no longer a member of the target is not met.

Figure 3:
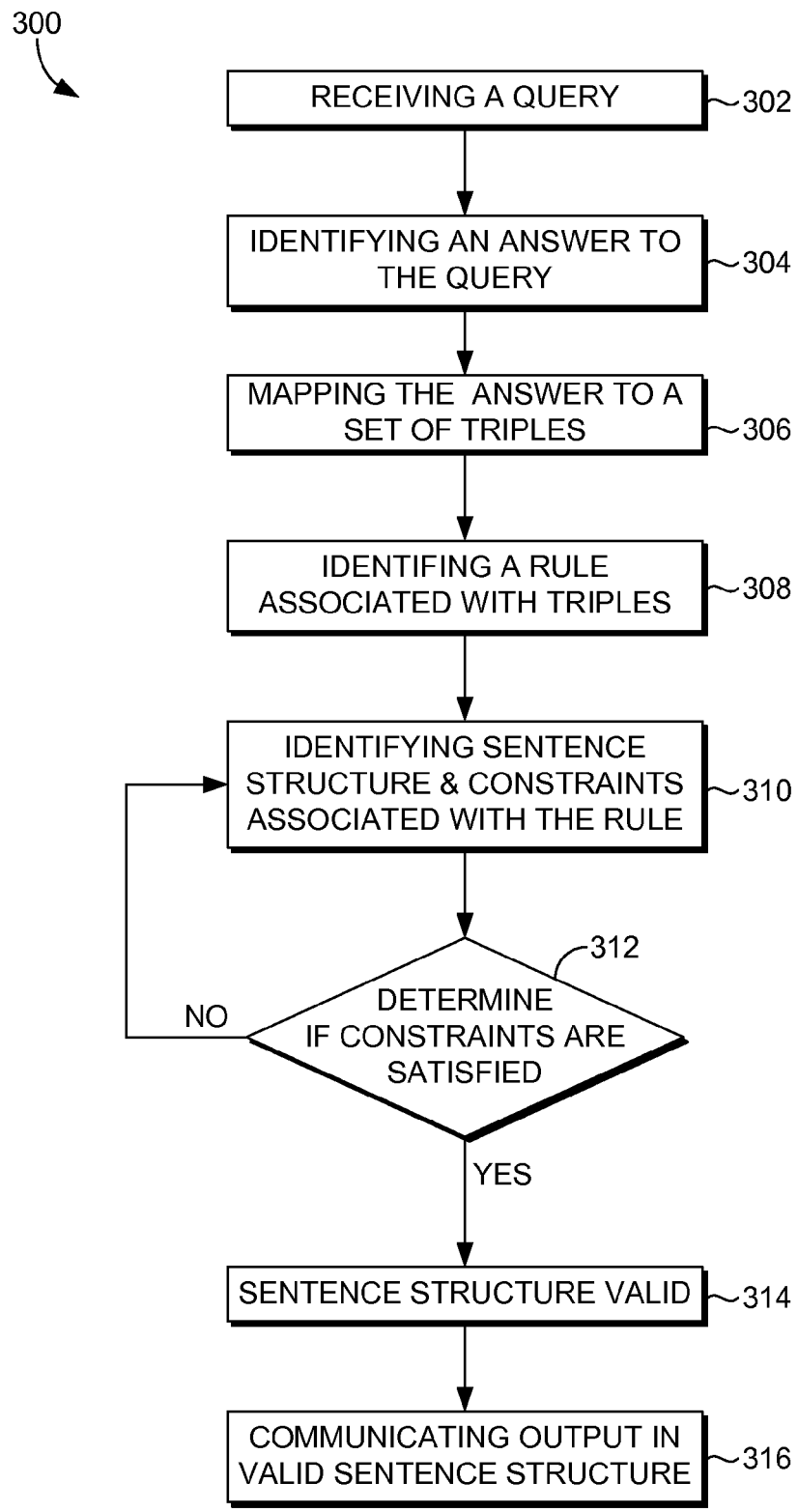
FIG. 3 is a flow diagram of an exemplary method for generating a natural language output, in accordance with an embodiment of the present invention.

Turning now to FIG. 3, a flow diagram is depicted of an exemplary method 300 of generating a natural language output. At block 302, a query is received. The query may be a voice input query. The query may also be a textual input. At block 304 an answer to the query is identified. This may be based on a meaning of the query. At block 306 the query and answer are mapped to a set of triples. The set of triples represent the answer in a way that is machine readable and can be translated into a natural language output. At block 308 a rule associated with the set of triples is identified. A rule may include one or more sentence structures and one or more constraints associated with each sentence structure. The associated one or more sentence structures and one or more constraints are identified at block 310. At block 312 a determination is made whether constraints are satisfied. Each constraint associated with a sentence structure should be satisfied in order for the sentence structure to be a valid sentence structure. Based upon a determination that the constraints are not satisfied, the method 300 returns to block 310 to identify another sentence structure and associated constraints to evaluate. This continues until either a valid sentence structure is identified or there are no more sentence structures available to evaluate. If no valid sentence structure is identified then no output will be generated.

Based upon a determination that the constraints are satisfied, the sentence structure is identified as valid at block 314. An output is communicated at block 316 in the format of the valid sentence structure. The output may only be a single sentence or may be multiple sentences. The output may be a voice output such that the output is spoken to a user.

Figure 4:
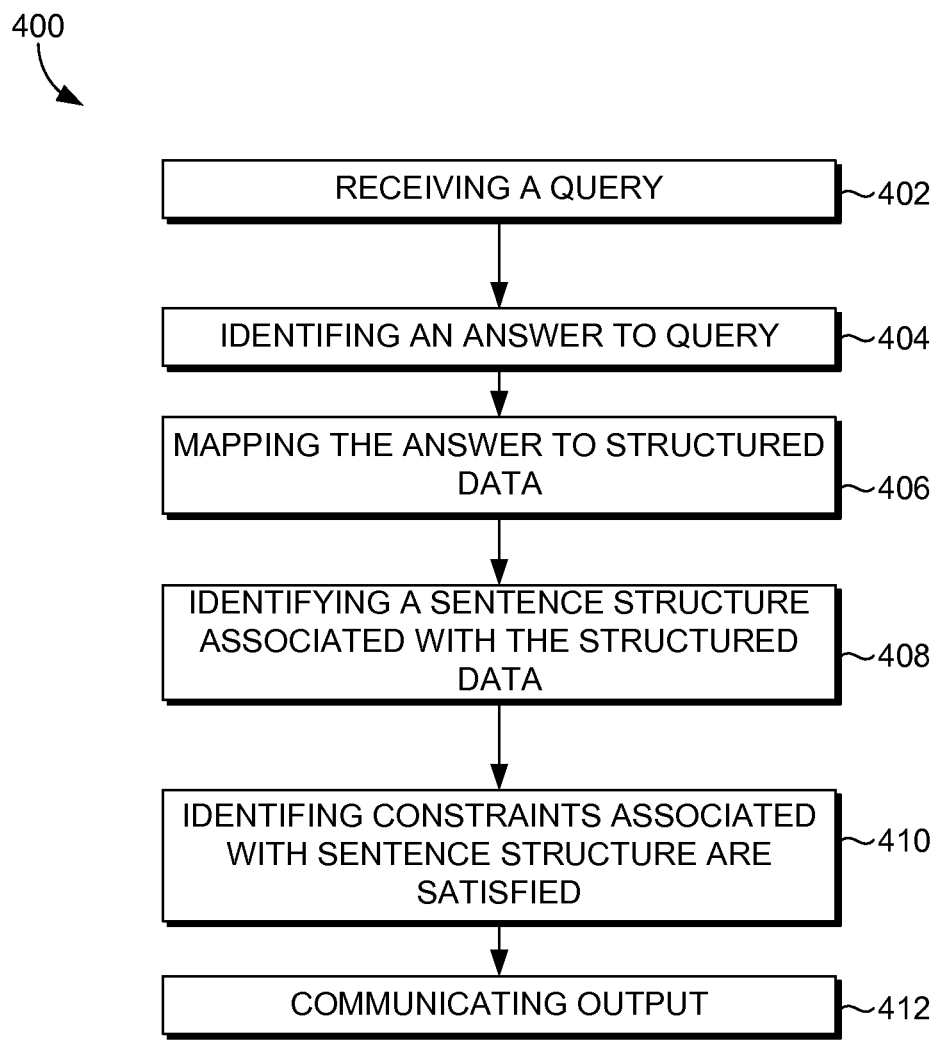
FIG. 4 is a flow diagram of an exemplary method of generating a natural language output, in accordance with an embodiment of the present invention.

Turning now to FIG. 4, a flow diagram is depicted of an exemplary method 400 of generating a natural language output. At block 402 a query is received. The query may be a voice input query. At block 404 an answer to the query is identified. At block 406 the answer is mapped to structured data. In an embodiment, the structured data is a set of triples. A sentence structure associated with the answer and set of triples is identified at block 408. At block 410 one or more constraints associated with the sentence structure are identified as being satisfied. Upon identifying that each of the one or more constraints is satisfied, an output answer is communicated in the form of a sentence at block 412.

Figure 5:
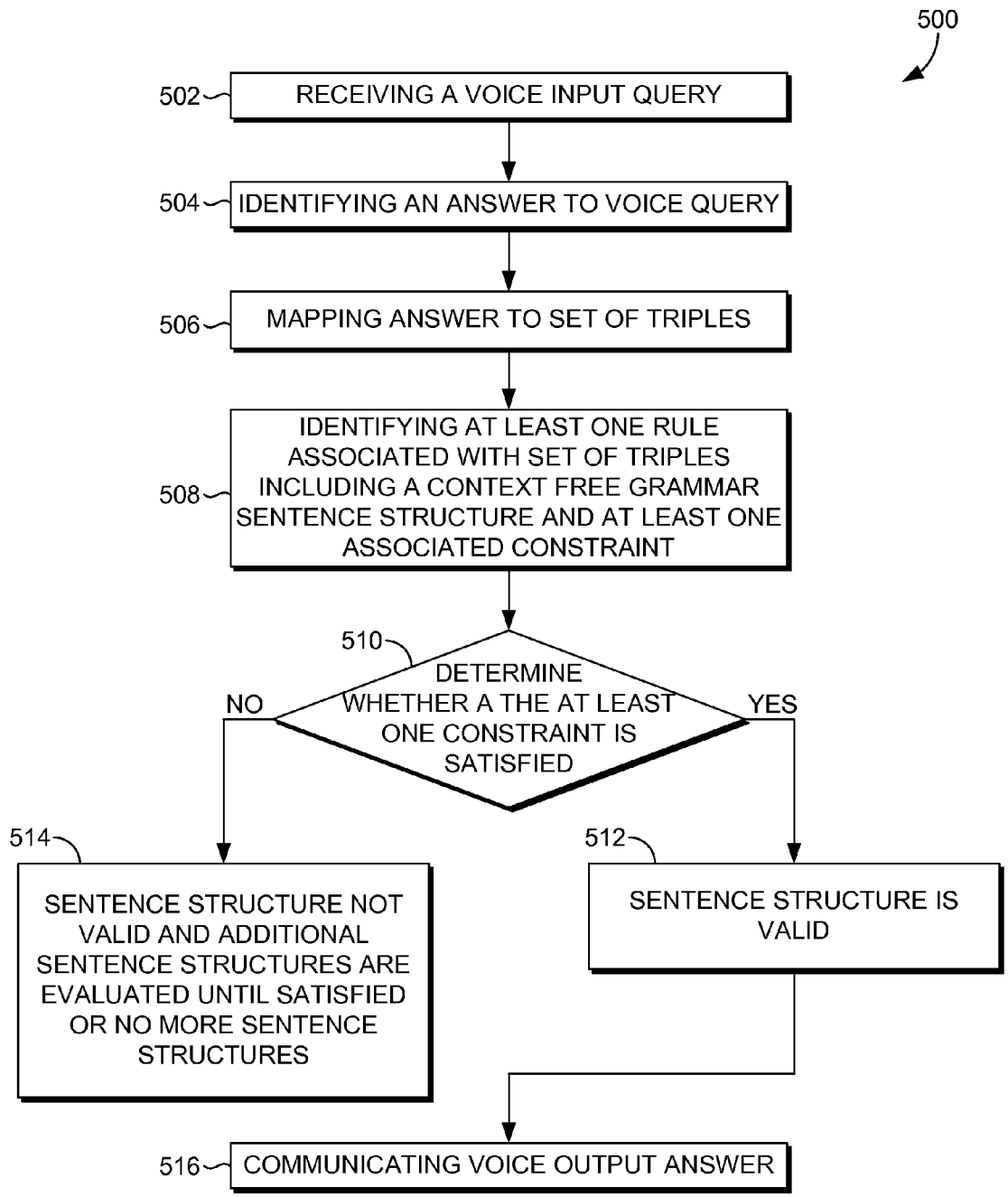
FIG. 5 is a flow diagram of an exemplary method of generating a natural language output, in accordance with an embodiment of the present invention.

Turning now to FIG. 5, a flow diagram is depicted of an exemplary method 500 of generating a natural language output. At block 502 a voice input query is received. The voice query input may be interpreted or parsed to a knowledge graph path associated with a set of triples. At block 504 an answer to the voice input query is identified. The answer may be based on the interpreted knowledge graph path. At block 506 the answer and query are mapped to a set of triples. The set of triples may be associated with the knowledge graph path. At block 508 at least one rules associated with the set of triples is identified. The at least one rule includes one or more sentence structures associated with the set of triples and one or more constraints associated with the one or more sentence structures. In embodiments, the sentence structure is a context free grammar sentence that satisfies all the answer triples constraints. At block 510 a determination is made whether the at least one constraint is satisfied. Upon determining the at least one constraint is not satisfied, the context free grammar sentence is identified as not valid at block 514 and additional sentence structures may be evaluated. Additional sentence structures may be evaluated until a valid sentence structure is identified or until there are no longer any sentence structures identified to evaluate. A final sentence is then constructed once a valid sentence structure is identified.

Upon determining the at least one constraint is satisfied, the sentence structure is identified as a valid sentence structure at block 512. Once a valid sentence structure is identified, a voice output answer is communicated at block 516.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage media having computer-executable instructions embodied thereon that, when executed by one or more computing devices, perform a method of generating a natural language output, the method comprising:
   receiving a query from a user;
   identifying an answer to the query;
   mapping the answer to structured data from a knowledge base;
   identifying a sentence structure associated with the structured data and associated with a plurality of constraints, wherein the sentence structure comprises one or more variables that are to be substituted with the structured data when forming a sentence, and wherein one variable of the one or more variables is associated with at least two constraints of the plurality of constraints such that each of the at least two constraints limits the type of value that may be substituted for the one variable;
   identifying that the plurality of constraints associated with the sentence structure are satisfied such that only valid sentences are output; and
   upon satisfying each of the plurality of constraints, communicating an output answer to the query in the form of the sentence.

2. The media of claim 1, wherein the query is a voice input query.

3. The media of claim 1, wherein the structured data is one or more sets of triples.

4. The media of claim 1, wherein the output answer is a voice output.

5. The media of claim 1, wherein the output answer is a voice output in combination with a web search results page.

6. A system for generating a natural language output, the system comprising:

a computing device associated with a natural language engine having one or more processors and one or more computer-storage media; and a data store coupled with the natural language engine, wherein the natural language engine:

identifies an answer to a query;

maps the answer to at least one set of triples from a knowledge base;

identifies a sentence structure associated with the at least one set of triples and associated with a plurality of constraints, the sentence structure comprising one or more variables that are to be substituted with the at least one set of triples when forming a sentence, wherein one variable of the one or more variables is associated with at least two constraints of the plurality of constraints such that each of the at least two constraints limits the type of value that may be substituted for the one variable;

identifies that the plurality of constraints associated with the sentence structure are satisfied such that only valid sentences are output; and communicates an output answer to the query in the form of the sentence.

7. The system of claim 6, wherein the query is a voice input query.

8. The system of claim 6, wherein the output answer is a voice output.

9. The system of claim 6, further comprising a query parser configured to identify a meaning of the query.

10. The system of claim 6, wherein the natural language engine communicates the output answer when the plurality of constraints associated with the sentence structure is satisfied.

11. The system of claim 6, wherein the natural language engine is configured to evaluate a plurality of sentence structures until a sentence structure having each constraint associated therewith is satisfied.

12. The system of claim 6, wherein the at least one set of triples is associated with a group of sentence structures, wherein the group includes at least one sentence structure associated with the at least one set of triples.

13. A computerized method for generating a natural language output, the method comprising:

receiving a query from a user, wherein the query is a voice input query from the user;

identifying an answer to the voice input query;

mapping the answer to a set of triples;

identifying at least one rule associated with the set of triples, wherein the at least one rule includes a context free grammar sentence structure associated with the set of triples and a plurality of constraints associated with the context free grammar sentence structure, wherein the context free grammar sentence structure comprises one or more variables that are to be substituted with the set of triples when forming a final sentence, and wherein one variable of the one or more variables is associated with at least two constraints of the plurality of constraints such that each of the at least two constraints limits the type of value that may be substituted for the one variable;

determining whether the plurality of constraints associated with the context free grammar sentence structure is satisfied; and upon determining that the plurality of constraints associated with the context free grammar sentence structure is satisfied, communicating a voice output answer to the voice input query in a comprising the final sentence.

14. The method of claim 13, further comprising upon determining that the plurality of constraints associated with the context free grammar sentence structure is not satisfied, identifying a second context free grammar sentence structure associated with the set of triples.

15. The method of claim 14, wherein the second context free grammar sentence is selected as an output sentence when each constraint associated with the second context free grammar sentence is satisfied.

16. The method of claim 13, wherein the voice output answer is a single sentence.

17. The method of claim 13, wherein the voice output answer is delivered via a mobile phone.

* * * * *